July 23, 1935.  G. E. PARKER  2,008,925

SPRING SHACKLE

Filed Aug. 17, 1929

Inventor
Guy E. Parker
By Blackmore, Spencer & Flint
Attorneys

Patented July 23, 1935

2,008,925

UNITED STATES PATENT OFFICE 2,008,925

SPRING SHACKLE

Guy E. Parker, Birmingham, Mich., assignor to General Motors Corporation, Detroit, Mich., a corporation of Delaware Application August 17, 1929, Serial No. 386,522

3 Claims. (Cl. 267—17)

In a well constructed automotive vehicle, which is provided with semi-elliptic front load-carrying leaf springs, which are connected at their front ends to the side members of the chassis frame by pivot bolts and at their rear ends to the side members of the chassis frames by shackles, steering wheel kick results principally from three causes, viz., front wheel tramp, front wheel shimmy, and the movement of the road wheel, which is carried by the steering knuckle which carries the steering arm, when it encounters a bump in the road. Front wheel tramp and front wheel shimmy, in themselves, without regard to their effect on steering, are highly objectionable.

Steering wheel kick, which results from the causes mentioned above, front wheel tramp, and front wheel shimmy can be greatly reduced, if not entirely eliminated, by connecting the front end of the front spring, on the side of the vehicle on which the steering arm is provided on the steering knuckle, to the chassis frame by means which allows a limited amount of resiliently opposed movement of the spring and the adjacent end of the front axle longitudinally of the spring.

My invention relates, generally, to devices for connecting an end of a leaf spring to a supporting or supported member so as to allow a limited amount of resiliently opposed movement of the spring longitudinally of itself, and, particularly, to such a device which is peculiarly adapted for use in connecting one end of the front spring which is located on the side of the vehicle on which the steering arm is provided on the steering knuckle to the chassis frame so as to eliminate steering wheel kick, front wheel tramp, and front wheel shimmy.

For a better understanding of the nature and objects of the present invention, reference is made to the following specification in which is described the preferred embodiment of my invention which is illustrated in the accompanying drawing.

Figure 1:
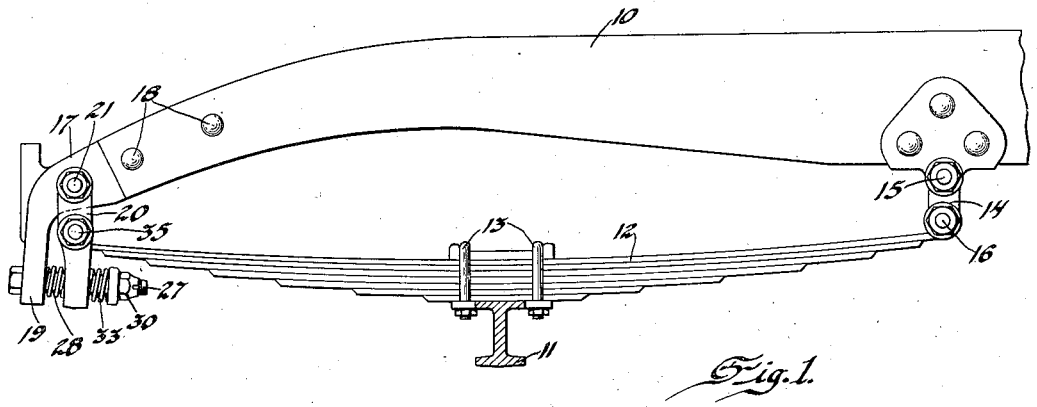
Figure 1 is a view, showing, in side elevation, the front end of the side member on the steering side of the chassis frame and the associated load-carrying spring of an automotive vehicle.
Figure 2:
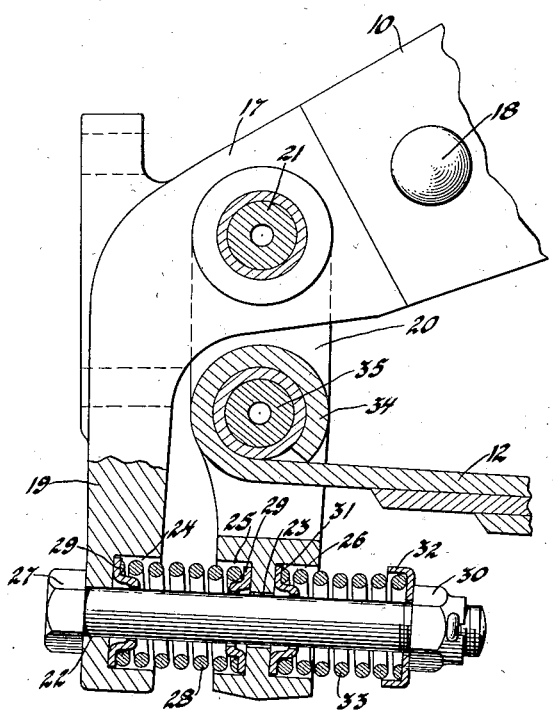
Figure 2 is an enlarged side elevation, with parts broken away and in section, of the front connection of the load-carrying spring to the chassis frame shown in Figure 1.
Figure 3:
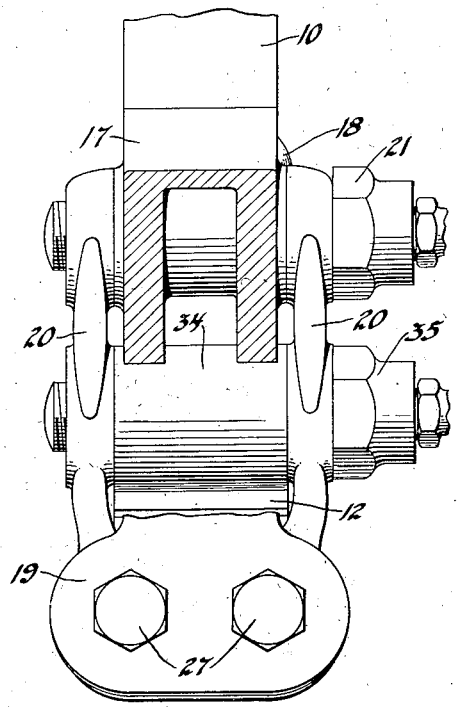
Figure 3 is an enlarged end elevation, with parts broken away and in section, of the front connection of the load-carrying spring to the chassis frame shown in the preceding figures.

In the drawing, the reference character 10 indicates the chassis frame of an automotive vehicle. To support the front end of the vehicle from the road wheels, there are provided an axle 11 and load-carrying leaf springs 12 which are secured to the axle by means of U-bolts 13. The rear ends of the springs 12 are connected to intermediate portions of the side members of the chassis frame by means of shackles 14 which are connected to the chassis frame by pivot bolts 15 and to the springs by pivot bolts 16.

To connect the front end of the spring 12 on the side of the vehicle on which the steering arm is provided on the steering knuckle to the side member of the chassis frame, there is provided a bracket 17 which includes a portion which extends into the channel of the side member of the chassis frame and is secured thereto by rivets 18 and a downwardly directed portion 19. Through the extremities of the legs of a U-shaped shackle 20, which straddles the intermediate portion of the bracket 17, and through the intermediate portion of the bracket, there extends a bolt 21, which pivotally connects the shackle to the bracket.

Through the lower extremity of the downwardly directed portion of the bracket 17 extends a pair of horizontally spaced openings 22. Through the bight of the shackle extends a pair of horizontally spaced openings 23, which are slightly larger in diameter than the openings 22, and of which each is substantially axially aligned with one of the openings 22. Each of the openings 22 is, as indicated at 24, countersunk from the rear side of the downwardly directed portion of the bracket 17, and each of the openings 23 is, as indicated at 25 and 26, countersunk from both sides of the shackle.

Through each pair of aligned openings 22 and 23, there extends a bolt 27 which fits snugly in the opening 22 and rather loosely in the opening 23. Between the bracket 17 and the shackle 20 extend a pair of coil springs 28, of which each surrounds one of the bolts 27 and is seated at its opposite ends, through the intermediary of washers 29, in one of the recesses 24 and one of the recesses 25. Surrounding the rear end of each of the bolts 27 and seated at its opposite ends in one of the recesses 26 and against a nut 30, which is threaded on the bolt 27, through the intermediary of washers 31 and 32, respectively, is a coil spring 33. The initial load on, or compression of, the springs 28 and 33, and the position of rest of the shackle 20 can be adjusted by screwing in or out on the nuts 30.

Between the intermediate portion of the legs of the shackle 20, there is located an eye 34 which is formed on the front end of the spring 12. Through the intermediate portions of the legs of the shackle and through the eye 34, there extends a bolt 35 which pivotally connects the front end of the spring to the shackle.

While vertical forces applied to the shackle 20 through the spring 12 will have no tendency to cause it to swing about the pivot 21 which connects it to the bracket 17, movement of the spring longitudinally of itself will cause the shackle to rock about the pivot 21. This pivotal movement of the shackle 20 will cause either the springs 28 or the springs 33 to be further loaded or compressed, and, consequently pivotal movement of the shackle will be resiliently opposed, the movement of the spring longitudinally of itself will be resiliently cushioned, and front wheel kick, front wheel shimmy, and front wheel tramp will be eliminated.

Although I have shown and described a preferred embodiment of my invention, it is to understood that this has been done by way of example and not by way of limitation, and that the scope of my invention is to be limited only by the appended claims.

I claim:

1. In an automotive vehicle, a frame member having a horizontal portion and a portion depending therefrom, a U-shaped shackle straddling the horizontal portion of the frame member and pivotally connected thereto, a leaf spring having one end located between the intermediate portions of the legs of the shackle and pivotally connected thereto, a pair of elements extending through the lower end of the shackle and through the depending portion of the frame member, resilient means surrounding a portion of each of the elements and located between the depending portion of the frame member and the shackle, and resilient means surrounding the portions of the elements on the opposite side of the shackle and located between the shackle and abutments carried by the elements.

2. In an automotive vehicle, a substantially horizontally disposed frame member on which there is provided a downwardly directed extremity, a link which is pivotally connected to the substantially horizontally disposed frame member and depends therefrom, a leaf spring of which one end is pivotally connected to an intermediate portion of the link, and resilient means associated with the lower end of the link and the downwardly directed extremity to oppose oscillatory movement of the link about its pivotal connection to the substantially horizontally disposed frame member.

3. In an automotive vehicle, an approximately horizontally disposed frame member on which there is provided an angularly related extremity, a link which is pivotally mounted on the approximately horizontally disposed frame member and extends approximately parallel to the angularly related extremity, a leaf spring of which one end is pivotally connected to the link, and resilient means associated with the link and the angularly related extremity to oppose oscillatory movement of the link about its pivotal connection to the approximately horizontally disposed frame member.

GUY E. PARKER